(12) United States Patent
Wang et al.

(10) Patent No.: US 9,032,526 B2
(45) Date of Patent: May 12, 2015

(54) EMULATING MIXED-CODE PROGRAMS USING A VIRTUAL MACHINE INSTANCE

(75) Inventors: Xun Wang, Sammamish, WA (US); Adrian Emil Stepan, Bellevue, MA (US); Timothy David Ebringer, Richmond (AU)

(73) Assignee: Microsoft Technology Licensing, LLC, Redmond, WA (US)

( * ) Notice: Subject to any disclaimer, the term of this patent is extended or adjusted under 35 U.S.C. 154(b) by 625 days.

(21) Appl. No.: 13/106,724

(22) Filed: May 12, 2011

(65) Prior Publication Data

US 2012/0290848 A1 Nov. 15, 2012

(51) Int. Cl.
*G06F 11/00* (2006.01)
*G06F 21/56* (2013.01)

(52) U.S. Cl.
CPC ..................... *G06F 21/566* (2013.01)

(58) Field of Classification Search
USPC .......................................................... 726/24
See application file for complete search history.

(56) References Cited

U.S. PATENT DOCUMENTS

| | | | |
|---|---|---|---|
| 6,164,841 A | 12/2000 | Mattson, Jr. et al. | |
| 6,330,691 B1 | 12/2001 | Buzbee et al. | |
| 6,463,582 B1 | 10/2002 | Lethin et al. | |
| 7,636,856 B2 | 12/2009 | Gheorghescu et al. | |
| 7,793,272 B2 | 9/2010 | Andrews et al. | |
| 2003/0101439 A1 | 5/2003 | Desoli et al. | |
| 2007/0079375 A1* | 4/2007 | Copley | 726/22 |
| 2012/0266243 A1* | 10/2012 | Turkulainen | 726/24 |

OTHER PUBLICATIONS

Binary Translation: Static, Dynamic, Retargetable?; Cifuentes, Malhotra, Aug. 6, 2002.*
"Dynamic Recompiler Author's Guide", Retrieved at <<http://mamedev.org/devwiki/index.php/Dynamic_Recompiler_Author%27s_Guide>>, Retrieved on Dec. 21, 2010, pp. 6.
Cifuentes, et al., "Binary Translation: Static, Dynamic, Retargetable?", Retrieved at <<http://citeseerx.ist.psu.edu/viewdoc/download?doi=10.1.1.42.4302&rep=rep1&type=pdf>>, Aug. 6, 2002, pp. 10.
Bayer, et al., "Dynamic analysis of malicious code", Retrieved at <<http://auto.tuwien.ac.at/~chris/research/doc/virology06_dynamic.pdf>>, J Comput Virol, May 16, 2006, pp. 67-77.

* cited by examiner

*Primary Examiner* — Christopher Brown
(74) *Attorney, Agent, or Firm* — Brian Haslam; Mike Allen; Micky Minhas

(57) ABSTRACT

The subject disclosure is directed towards a technology for efficiently emulating program code that is protected by one or more various code virtualization techniques to detect the presence of malware. An emulation engine emulates a program containing a mix of native code, custom (e.g., virtualized obfuscated) code, and at least one emulator and/or interpreter that understands the custom code, by building a custom emulation component that is built by detecting and analyzing the internal emulator or interpreter. The custom emulation component may access a translation table built from the analysis, and also may simplify a plurality of instructions in the program into a lesser number of instructions in an intermediate language used for emulation.

20 Claims, 5 Drawing Sheets

EMULATING MIXED-CODE PROGRAMS USING A VIRTUAL MACHINE INSTANCE

BACKGROUND

Via the Internet, individuals and organizations with malicious intent distribute software that damages computer systems and/or is used to steal the personal information of users (including individual users or entities such as companies). Such malicious software, or malware, often exploits code vulnerabilities and/or gets installed onto users' computer systems by tricking users into taking some action.

To protect against malware, contemporary anti-malware software uses a variety of mechanisms to catch and quarantine malware, including by looking for patterns in the malware, referred to as signatures. One way malware authors try to avoid anti-malware detection is by obfuscating the underlying code and/or making it somewhat polymorphic so that its signature and behavior are not readily detectable.

Malware may be detected by emulation, in which the code is run in an emulation environment to look for patterns of behavior and other actions that malware needs to perform in order to accomplish its purpose. One way in which malware has evolved to avoid detection by emulation uses obfuscator packing, using a virtualizer packer, which creates its own virtualization-based protection with its own custom byte codes ("virtual machine protection"). In general, the malware's original instruction code is translated to a custom "bytecode" language. The distributed malware also includes an emulator or interpreter that understands this bytecode, and can emulate or interpret such instructions to achieve the same behavior as the original, native code would. One side-effect of virtualization is that the virtualized code uses significantly more instructions, compared to native code, to achieve any given task, e.g., a typical interpreter needs to execute hundreds of native instructions in order to interpret a single bytecode instruction. In addition to this, malware often uses redundant or useless instructions, both in the bytecode and in the interpreter itself, to further slow down its execution. Indeed, the time taken to emulate such virtualization-protected malware with existing emulation mechanisms, while possible, is typically too long to be feasible and acceptable to be performed on a customer's machine.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which virtualized obfuscated program code may be efficiently emulated. In one aspect, an emulation engine emulates a program containing a mix of native code and custom (e.g., virtualized obfuscated) code. A custom emulation component invoked by processing logic handles custom instruction blocks, including processing each custom instruction block into an intermediate language for emulation by the emulator component. A native component handles native instruction blocks by outputting instructions to the emulator component for emulation, which may be native instructions or intermediate language instructions. The emulator component may comprise a virtual machine instance, with the custom emulation component and native emulation components comprising front ends for the virtual machine instance.

In one aspect, a scanner module, invoked by the virtual machine to inspect certain points of interest detects the internal emulator or interpreter present in the program to be emulated, e.g., via one or more signatures. A code parser then analyzes the emulator or interpreter to dynamically build the custom emulation component. This may include dynamically building a translation table that the custom emulation component may access for translating custom target bytecode instructions into an intermediate language (IL), which can be further processed by a virtual machine back-end. All the front-ends output the same intermediate language, and in consequence, the same back-end can be used to process the intermediate language produced by either a native code, or a custom bytecode front-end. The custom emulation component may also simplify a plurality of instructions in the program into a lesser number of instructions in the intermediate language.

In one aspect, analyzing the internal emulator or interpreter comprises determining a custom binary format for each instruction that is used in the target code, and/or determining a decryption key used to encrypt the target code. Analyzing may further determine a de-obfuscation algorithm and any associated parameters, a range or multiple ranges of addresses in the program code containing target language instructions, and/or information related to exchanging state information between the native program code and the target language emulator or interpreter.

Program code is processed to detect whether the program code contains malware, in which the program code may contain native code, custom code, and an internal emulator or interpreter for the custom code. If a part of the program code corresponds to an emulator or interpreter, a custom emulator component is built by analyzing the emulator or interpreter. Emulating the program code is performed by handling the custom code via the custom emulator component instead of the internal emulator or interpreter, in which the custom emulator component processes the custom code into an intermediate language for emulation. An address of the internal emulator or interpreter may be maintained to invoke the custom emulator component upon any attempt by the program code to transfer control to the internal emulator or interpreter.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards emulating malware, which uses a technique known as "code virtualization," in a very efficient way. In general, this is achieved by reverse engineering the malware code such that a custom emulator component is dynamically created for the malware's custom (e.g., randomized) instruction set employed by the virtualization obfuscator. The custom emulator component is applied when the obfuscator otherwise attempts to use its own interpreter. This avoids the delay that is otherwise incurred if the obfuscator's interpreter is emulated using a generic, native code emulator.

In one aspect, the technology can efficiently emulate the behavior of a program containing more than one language, such as native binary code (x86) that is executable by the host CPU, and some custom bytecode or script language that is emulated/interpreted by an emulator/interpreter available to the same program. To this end, a dynamic translation engine includes the capability to dynamically switch front-end translation components and thereby handle native executable code as well as any target code (e.g., custom bytecode or script) in the same virtual machine instance. The technology is also able to dynamically analyze the interpreter or emulator (or both) used by such programs, in order to determine the instruction format and meaning for each custom target code instruction. The technology works effectively even when the target code is encrypted and/or obfuscated with various encryption and/or obfuscation algorithms, and enables detection of malware that has been obfuscated using virtual machine protection.

It should be understood that any of the examples herein are non-limiting. For one, other pattern matching mechanisms may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and/or protection against malware in general.

Figure 1:
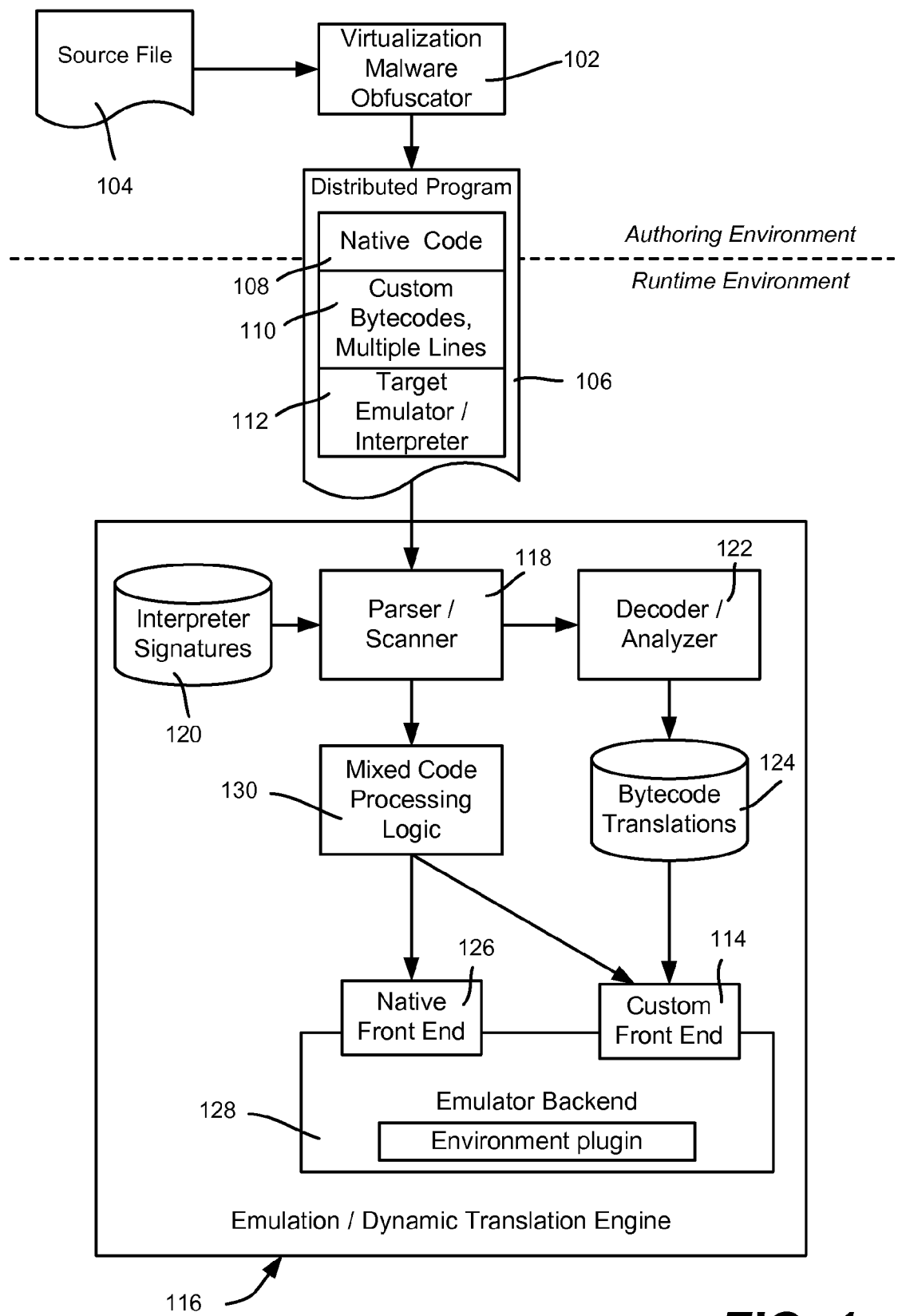
FIG. 1 is a block diagram representing example components for detecting malware including malware protected by virtualized obfuscation.

FIG. 1 is a generalized block diagram showing example components for detecting malware, including malware packed with a virtualization malware obfuscator 102. In general malware is authored in a source file 104 (or more than one), and packed with a virtualization packer 102 into a distributed file 106. As is known, the virtualization packer 102 generates a custom bytecode language that obfuscates the original source code/script, and moreover, often generates multiple custom bytecode instructions for each single instruction in the source code.

As represented in FIG. 1, the distributed file 106 contains one or more sections of native executable code 108, one or more sections of custom target code (e.g., bytecode) 110, and code that acts as an emulator/interpreter 112, depending on the type of language. At some point during execution, the native executable code 108 is executed, and includes an instruction that jumps to the emulator/interpreter 112, which then processes the custom bytecode 110. The custom bytecode 110 typically takes such a long time to run that it prevents a conventional emulator from ever getting to emulate and thereby detect malicious code in the file 106, which results in malicious actions being performed on the client machine.

Figure 2:
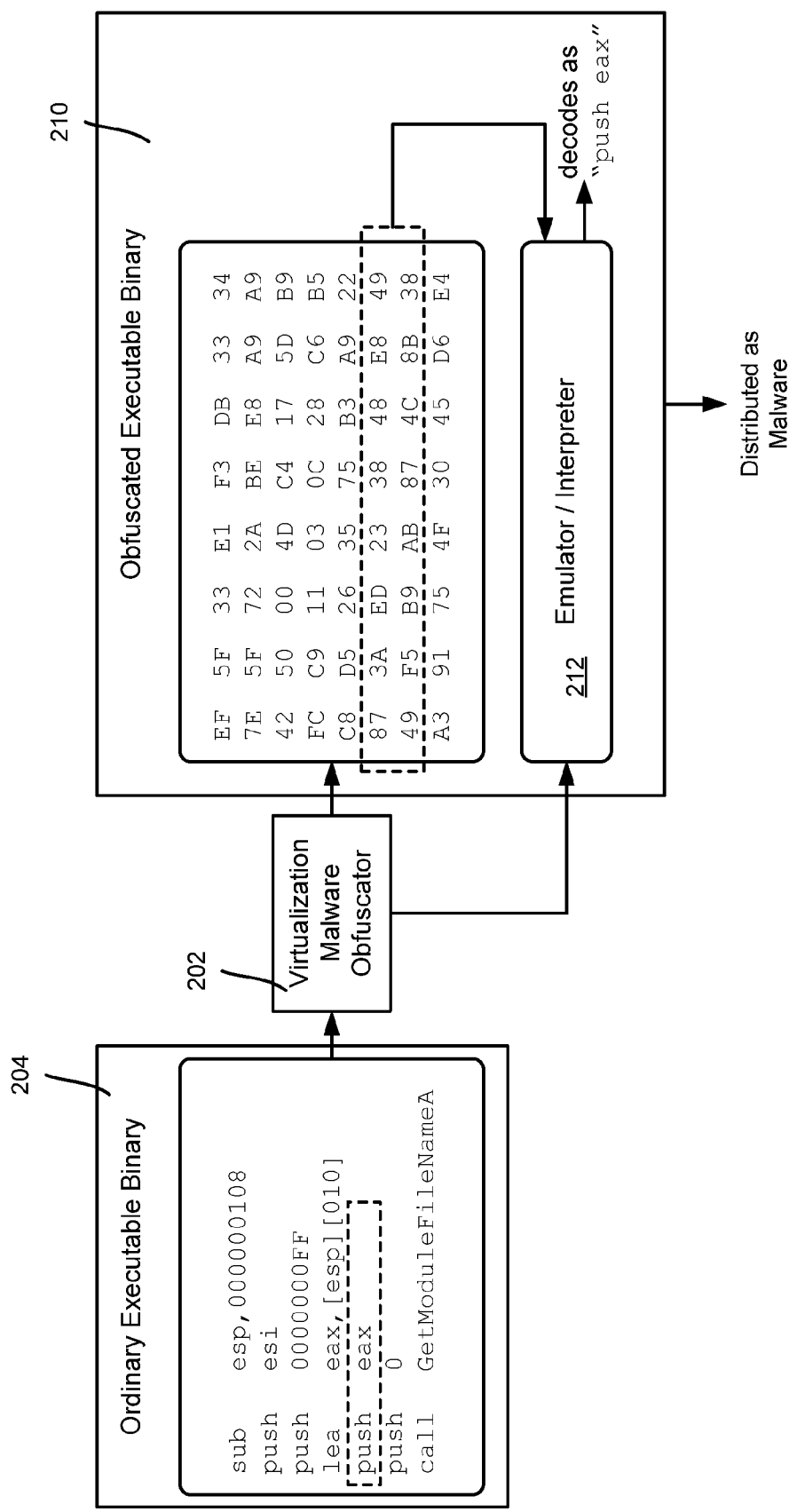
FIG. 2 is an example representation of how binary code may be virtualized into custom code.

FIG. 2 shows a more particular example of how a virtualization malware obfuscator 202 may operate at build time to transform ordinary executable binary code 204 into obfuscated executable binary code 210. The dashed boxes in the ordinary executable binary code 204 and the obfuscated executable binary code 210 show how one example instruction ("push eax") is encoded into a number of hexadecimal values, which the emulator/interpreter 212 is able to decode. The virtualization malware obfuscator 202 may use random translation or the like such that various instances of the obfuscated executable binary code 210 are differently encoded, with a corresponding internal emulator/interpreter generated for each particular instance. Compression, encryption and other algorithms may be used in the obfuscation.

Existing, previous solutions may detect the malware by emulating the corresponding target code of the emulator/interpreter of such bytecode/script language, for each bytecode/script instruction. However this can result in hundreds of native instructions being emulated for each such instruction. If detection of such malware is attempted using traditional emulation techniques, the time required to achieve detection may range from several minutes to a few hours per malware sample detected, making this method unsuitable for use in anti-malware software.

The technology described herein does not allow the bytecodes or the like to be processed by the emulator/interpreter 112 (FIG. 1), but instead emulates each instruction directly, (e.g., one emulated bytecode instruction instead of hundreds of interpreted/emulated native instructions). For emulated bytecodes that are encrypted or obfuscated, the technology described herein uses a dynamically built custom front end component 114 to translate (and possibly simplify) the bytecodes in real time, by applying decryption/de-obfuscation before emulation, thus further reducing the emulated instruction count. In practice, the technology operates on the order of two orders of magnitude faster than previously-known "traditional" emulation solutions.

To this end, an emulation and dynamic translation engine 116 applies code parsing and scanning techniques (block 118) at certain locations based upon block boundaries in the emulated code; (U.S. Pat. No. 7,636,856, assigned to the assignee of the present invention and hereby incorporated by reference, describes one way block boundaries may be located and used). In this way, the emulation and dynamic translation engine 116 is able to detect execution control transfers in the emulated code, between executing or interpreting different types of instruction code.

When such a control transfer is detected, and if the target code was not previously analyzed, additional analysis is performed upon the target code to determine if it is an interpreter or an emulator for a supported language/set of bytecodes. For example, in order to execute a custom bytecode, the internal emulator/interpreter 112 needs to be invoked, which is not encrypted so that its code can be executed. Note that multiple interpreters/emulators may be present, and indeed may be nested, however at least one emulator/interpreter cannot be virtualized/encrypted so that it can emulate/decrypt the next one, and so forth. Decompilation and decryption can proceed one at a time in such situations.

The parser (block 118) may be configured to look for such control transfers (e.g., jump instructions), and determines whether an internal emulator/interpreter is present at each such transferred-to location. To function as an emulator/interpreter, certain translation-related operations need to be performed, and thus, in practice, it is possible to extract relevant code or behavior patterns ("signatures") from such internal interpreters/emulators, where as used herein, "signature" is broadly used, and for example may include a set of regular expressions, a state machine, and so forth. These signatures can be evaluated against known signatures 120 and other data to detect the presence of an internal emulator/interpreter, e.g., in the same way signatures are used to detect other static malware.

Once an internal emulator/interpreter is detected, it can be automatically analyzed (including decompiling it) by a decoder/analyzer 122, to dynamically learn the bytecode language that this particular interpreter is able to understand/interpret. For example, one thing that an interpreter has to do is decode custom bytecodes, and perform certain operations (load/store, arithmetic/logic operations, branch operations, and so forth), as instructed by such bytecodes. This information may be used to dynamically construct a mapping of bytecode values 124 to normalized operation identifiers (IDs), which can be further used to translate each custom bytecode instruction into intermediate language instructions. Further, any decryption key and/or de-obfuscation algorithm that was used also needs to be present for the internal emulator/interpreter to be able to use it, and these are likewise recognized. Note that once an emulator/interpreter is found, its address is marked such that any other jumps to that emulator/interpreter are known, and it need not be re-analyzed.

Thus, if an interpreter/emulator is identified, its code is analyzed to determine the information needed for decoding and emulating that bytecode language. The analysis determines, among other things, the binary format for each instruction in the target language, and any decryption keys/de-obfuscation algorithms and parameters if the target language is encrypted and/or otherwise obfuscated.

The analysis also may determine a range or multiple ranges of addresses (locations) in the program code containing target language instructions, and the information regarding the mechanism or mechanisms used for (e.g., the details relevant to) exchanging state information between the native program code and the target language emulator/interpreter. This may include memory locations used to store state information for the source and target languages, the layout of such information, and so forth.

The custom front-end 114 of the emulation and dynamic translation engine 116 comprises a component that decodes instructions from the custom bytecode target language. This may be used to emulate/JIT bytecode language instructions directly, as opposed to emulating the internal emulator or interpreter. Instructions may be simplified as well, e.g., sequences of instructions that are recognized as not doing anything or containing redundant code may be bypassed or condensed.

Similarly, a native front end component 126 translates native executable code into IL, and provides the IL to the backend component 128, which may translate the IL into code executable on the host machine and execute it (JIT compiling), or emulate the IL, depending on the type of the host machine. Mixed code processing logic 130 switches between front ends 114 and 126 as appropriate, e.g., the custom front end 114 is switched to when the malware's internal emulator/interpreter 112 would otherwise be invoked, and the native front end 126 is switched in when the malware's internal emulator/interpreter 112 would otherwise be exited.

Upon switching front-ends, the state of the virtual machine is updated to reflect the corresponding "state change" in the emulated program. In the case of encrypted/obfuscated bytecode, the front-end that is "switched in" proceeds by decrypting/de-obfuscating the target code and translating the target code into an internal intermediate language (IL) that can be further processed by the backend component without specific knowledge about the original bytecode. Note that decrypting/de-obfuscating may be tracked for the target code so that it need only be performed once.

In one implementation, the intermediate language produced by the front-ends has a common binary format that may be further processed by a single virtual machine backend component, represented in FIG. 1 by the emulator backend 128. Such processing comprises translating the intermediate language into code that is executed by the host CPU (JIT compiling), or emulating the intermediate language. An environment plug-in 132 extends the functionality of the generic virtual machine environment, by facilitating interactions between the custom bytecode and the machine environment, that are specific to the bytecode.

Figure 3:
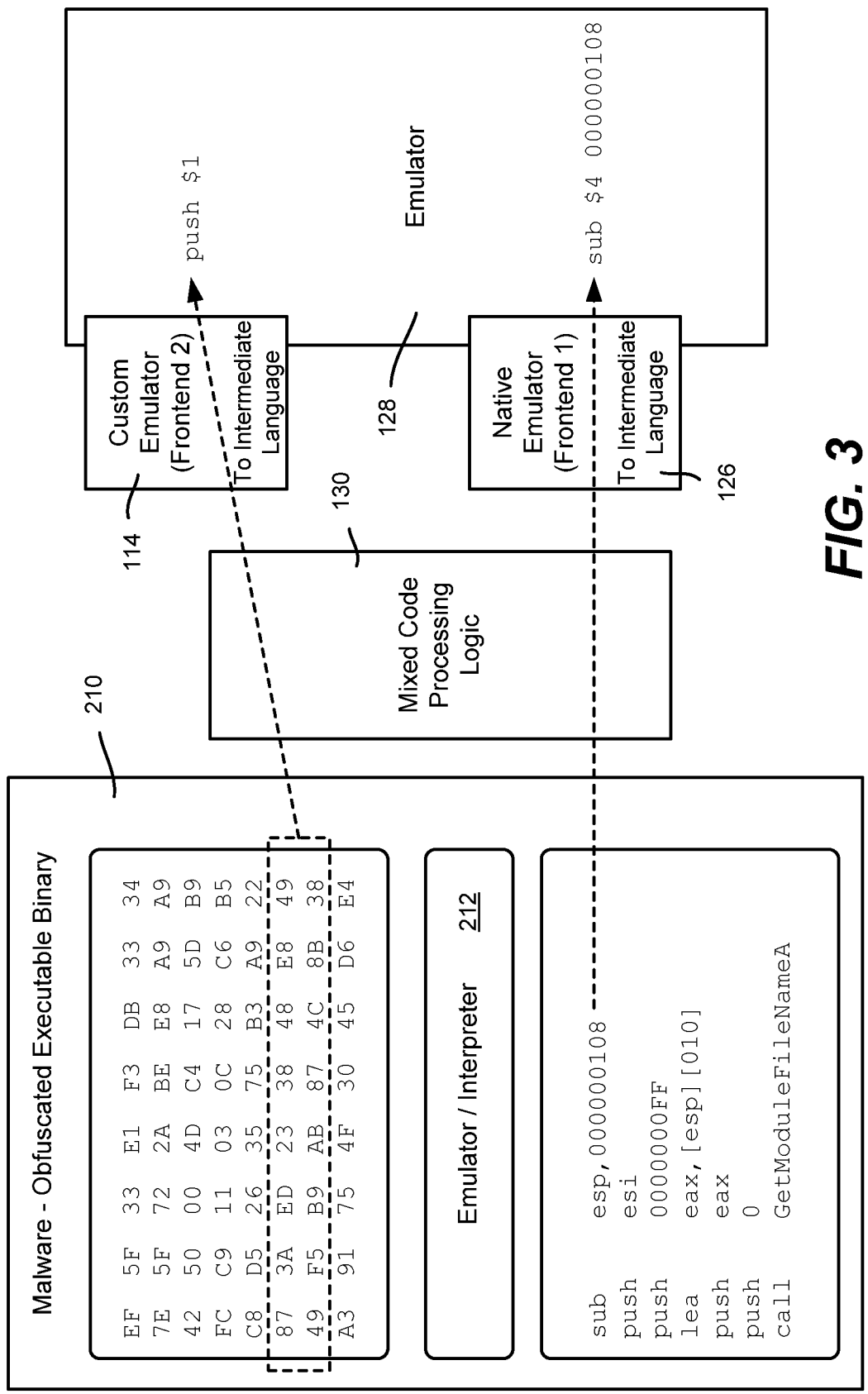
FIG. 3 is a representation of how obfuscated malware including a mix of native and custom code is processed for efficient emulation.

FIG. 3 shows a more particular example, in which the normal (native) code is directly emulated by the native emulator 126 transforming the code into the intermediate language which is further passed to the virtual machine back-end for JIT-compiling or emulation. For the custom code, the mixed code processing logic 130 "switches in" front end 2, namely the custom emulator 114 previously constructed by analyzing the interpreter 212, which translates the custom bytecode into IL which is further passed to the same backend as described above, and processed in the same way.

Figure 4:
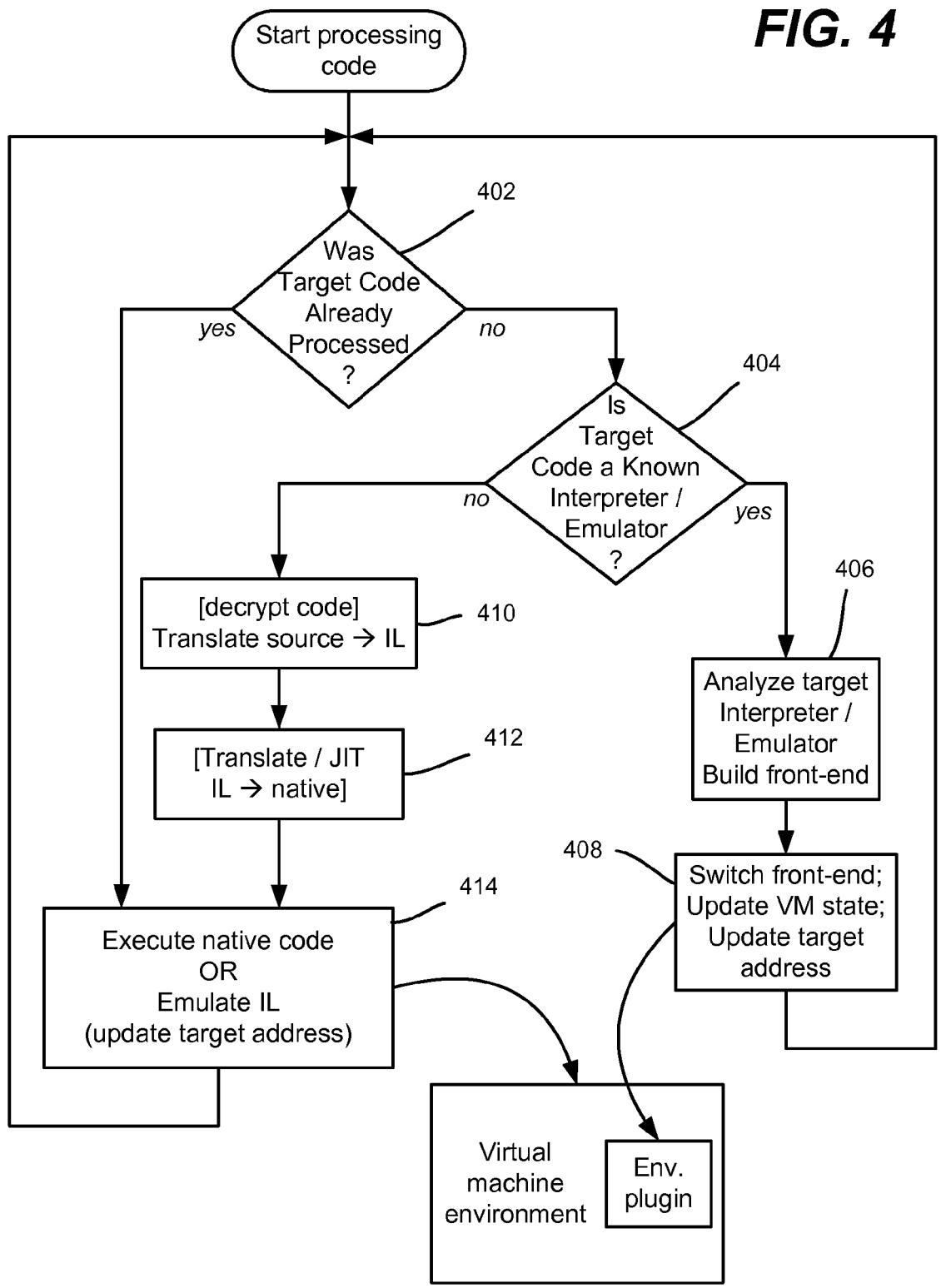
FIG. 4 is a flow diagram representing example steps for processing target code to detect malware.

FIG. 4 is a flow diagram summarizing switched emulation via the above-described technology using various example steps. Step 402 represents determining if a set of the target code (the code to be emulated) was already processed, e.g., on a per-block basis as tracked by its starting address. The first time through this is not true, and thus step 402 branches to step 404 to determine whether the target code is a known emulator/interpreter, e.g., detected using signatures and/or behavioral analysis as described above. As also described above, any emulator/interpreter can be quickly located by initially looking for and following branch instructions.

In order to execute target language custom bytecode, at some point the target code jumps to the emulator/interpreter, whereby step 404 branches to step 406. Step 406 represents analyzing the emulator/interpreter to build the front-end component. Once built, step 408 switches the system to use the front end, e.g., by updating the virtual machine (VM) state, and updating the target address so that this block of target code is known to have been processed. Any control transfers to the internal emulator/interpreter are now handled by the newly built custom front end component. If more than one emulator/interpreter is found, steps 406 and 408 repeat once for each, however for purposes of brevity only one such emulator/interpreter is described hereinafter.

After the front end is built, step 404 branches to step 410 for any target code that has not already been processed. Step 410 decrypts the code, if needed, and translates the source code to an intermediate language (IL). The intermediate language may be translated or JIT (just-in-time) compiled into native code, where it is executed at step 414; the intermediate language instead may be emulated.

As can be seen, described is dynamically building an emulation front-end and/or translation table using real time analysis and decompilation (automatic reverse engineering) of target code, particularly its emulator/interpreter of that target code. Encrypted and/or obfuscated code may be processed by applying decryption/code optimizations statically, in the code translation phase performed by the dynamically-build front-end.

In this way, a given program which may contain "mixed code" (a combination of natively-executable binary code, and some other language/code such as bytecode or script language) is able to be efficiently emulated. In one implementation, mixed-code programs can be emulated using a single virtual machine instance, by dynamically changing the frontend of an emulation engine designed to use multiple frontends, e.g., switching the frontend between native code and a different language.

Exemplary Computing Device

As mentioned, advantageously, the techniques described herein can be applied to any device. It can be understood, therefore, that handheld, portable and other computing devices and computing objects of all kinds including robots are contemplated for use in connection with the various embodiments. Accordingly, the below general purpose remote computer described below in FIG. 5 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 5:
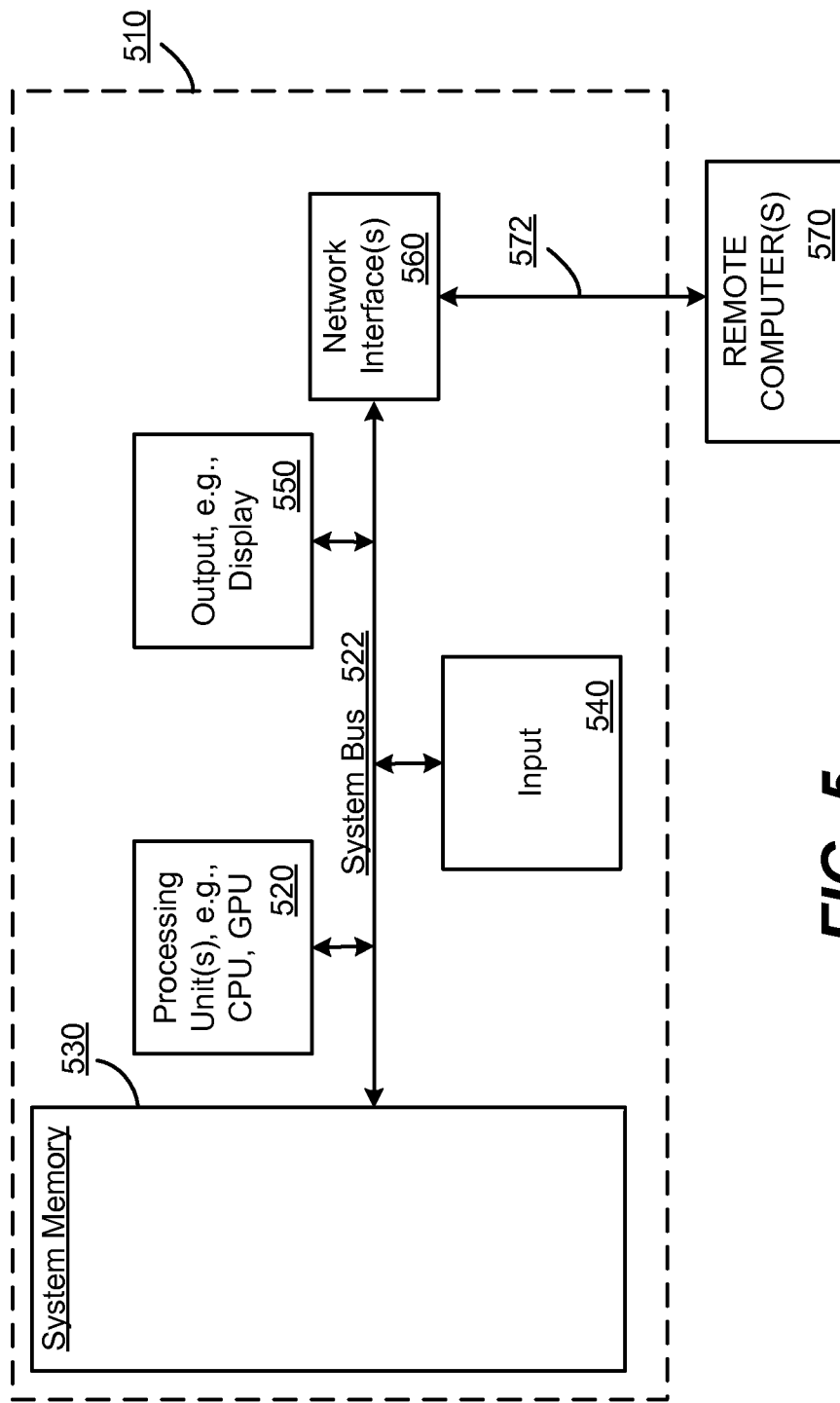
FIG. 5 is a block diagram representing an exemplary non-limiting operating environment and computing system into which one or more aspects of various embodiments described herein can be implemented.

FIG. 5 thus illustrates an example of a suitable computing system environment 500 in which one or aspects of the embodiments described herein can be implemented, although as made clear above, the computing system environment 500 is only one example of a suitable computing environment and is not intended to suggest any limitation as to scope of use or functionality. In addition, the computing system environment 500 is not intended to be interpreted as having any dependency relating to any one or combination of components illustrated in the exemplary computing system environment 500.

With reference to FIG. 5, an exemplary remote device for implementing one or more embodiments includes a general purpose computing device in the form of a computer 510. Components of computer 510 may include, but are not limited to, a processing unit 520, a system memory 530, and a system bus 522 that couples various system components including the system memory to the processing unit 520.

Computer 510 typically includes a variety of computer readable media and can be any available media that can be accessed by computer 510. The system memory 530 may include computer storage media in the form of volatile and/or nonvolatile memory such as read only memory (ROM) and/or random access memory (RAM). By way of example, and not limitation, system memory 530 may also include an operating system, application programs, other program modules, and program data.

A user can enter commands and information into the computer 510 through input devices 540. A monitor or other type of display device is also connected to the system bus 522 via an interface, such as output interface 550. In addition to a monitor, computers can also include other peripheral output devices such as speakers and a printer, which may be connected through output interface 550.

The computer 510 may operate in a networked or distributed environment using logical connections to one or more other remote computers, such as remote computer 570. The remote computer 570 may be a personal computer, a server, a router, a network PC, a peer device or other common network node, or any other remote media consumption or transmission device, and may include any or all of the elements described above relative to the computer 510. The logical connections depicted in FIG. 5 include a network 572, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a method performed at least in part on at least one computer processor, comprising:
processing program code to detect whether the program code includes malware, including determining whether the program code contains an internal emulator or interpreter, and if so, analyzing the internal emulator or interpreter to generate a custom emulator component; and
using the custom emulator to translate custom bytecode language in the program code into an intermediate language for emulation.

2. The method of claim 1 further comprising, emulating the program code by switching between a native code emulator component when a program code instruction is part of native code and the custom emulator component when a program code instruction is part of the custom bytecode language.

3. The method of claim 1 wherein analyzing the internal emulator or interpreter comprises determining a custom binary format for each instruction that is used in the custom bytecode language.

4. The method of claim 1 wherein analyzing the internal emulator or interpreter further comprises determining a decryption algorithm and one or more decryption keys used in conjunction with the decryption algorithm to decrypt the custom bytecode language, and further comprising, using at least one of the decryption keys and the decryption algorithm for decrypting custom bytecode language.

5. The method of claim 1 wherein analyzing the internal emulator or interpreter further comprises determining a de-obfuscation algorithm and one or more associated parameters used to obfuscate the custom bytecode language, and further comprising, using the de-obfuscation algorithm to de-obfuscate the custom bytecode language.

6. The method of claim 1 wherein analyzing the internal emulator or
interpreter further comprises determining a range or multiple ranges of addresses in the program code containing target language instructions.

7. The method of claim 1 wherein analyzing the internal emulator or
interpreter further comprises determining information of a mechanism used for exchanging state information between the native program code and the target language emulator or interpreter.

8. One or more computer-readable storage devices having computer-executable instructions, which when executed by a computer processor perform steps of a process comprising:
processing program code to detect whether the program code contains malware, the program code containing native code, custom code, and an internal emulator or interpreter for the custom code;
determining whether a part of the program code corresponds to an emulator or interpreter, and if so, building a custom emulator component by analyzing the emulator or interpreter; and
emulating the program code, including handling the custom code via the custom emulator component instead of the internal emulator or interpreter, the custom emulator component processing the custom code into an intermediate language for emulation.

9. The one or more computer-readable storage devices of claim 8 having further computer-executable instructions comprising processing the native code into an intermediate language before emulating.

10. The one or more computer-readable storage devices of claim 8 wherein the custom emulator component processes the custom code into an intermediate language by translating custom code to a known bytecode language based upon analyzing the emulator or interpreter.

11. The one or more computer-readable storage devices of claim 8 having further computer-executable instructions comprising maintaining an address of each internal emulator or interpreter to invoke the custom emulator component upon any attempt by the program code to transfer control to the internal emulator or interpreter.

12. A system comprising:
a memory;
a computer processor coupled to the memory; and
an emulation engine implemented on the computer processor, including an emulator component, the emulation engine configured with a scanner to detect whether program code includes malware, including determining whether the program code contains an internal emulator or interpreter, and if so, to use a code parser to analyze the internal emulator or interpreter to generate a custom emulator component, the emulation engine further configured to use the custom emulator component to translate custom bytecode language in the program code into an intermediate language for emulation by the emulator component, including by outputting instructions to the emulator component for emulation.

13. The system of claim 12 wherein the emulator component comprises a virtual machine instance, and wherein the emulation component comprises a plurality of front-ends, including one front end configured to decode or translate, or both decode and translate from executable code, and at least one other front-end each configured to translate a supported computer language into a platform-independent intermediate language.

14. The system of claim 12 wherein the custom emulation component translates from an alternate language or bytecode, or both, into an intermediate language that is common with an intermediate language.

15. The system of claim 12 wherein the scanner comprises a scanner module configured to detect an emulator or interpreter in the program, and wherein the code parser is configured to analyze the emulator or interpreter to dynamically build the custom emulation component.

16. The system of claim 15 wherein the scanner module detects the emulator or interpreter in the program via one or more signatures.

17. The system of claim 15 wherein the code parser determines a custom binary format for each instruction that is used.

18. The system of claim 15 wherein the code parser determines a decryption algorithm and one or more decryption keys used in conjunction with the decryption algorithm.

19. The system of claim 15 wherein the code parser determines a de-obfuscation algorithm and one or more associated parameters used to obfuscate at least one instruction in the program.

20. The system of claim 12 wherein the custom emulation component simplifies a plurality of instructions in the program by generating a lesser number of intermediate language instructions relative to translating the same original instructions one-by-one.

* * * * *